United States Patent [19]

Matsunami et al.

[11] Patent Number: 4,880,644

[45] Date of Patent: Nov. 14, 1989

[54] PROCESS FOR PRODUCING IMITATION MARZIPAN

[75] Inventors: Hidenobu Matsunami; Takahiro Tsuruda; Naoki Hitosugi; Yoshinori Hirukawa, all of Sennan, Japan

[73] Assignee: Fuji Oil Company, Limited, Osaka, Japan

[21] Appl. No.: 251,443

[22] Filed: Sep. 30, 1988

[30] Foreign Application Priority Data

Sep. 30, 1987 [JP] Japan .................................. 62-248617
Dec. 16, 1987 [JP] Japan .................................. 62-319841
May 25, 1988 [JP] Japan .................................. 63-129306

[51] Int. Cl.$^4$ ............................................. A23G 3/00
[52] U.S. Cl. ........................................ 426/46; 426/50; 426/613; 426/634; 426/660
[58] Field of Search ................... 426/46, 50, 634, 660, 426/658, 659, 613

[56] References Cited

U.S. PATENT DOCUMENTS 4,119,733  10/1978  Hsieh et al. ............................ 426/49

FOREIGN PATENT DOCUMENTS 206622  2/1984  German Democratic Rep. .

*Primary Examiner*—Donald E. Czaja
*Assistant Examiner*—C. Callahan
*Attorney, Agent, or Firm*—Wenderoth, Lind & Ponack

[57] ABSTRACT

A process for producing an imitation marzipan which comprises soaking dehulled, degerminated and cracked soy beans in hot water, cooling and dehydrating the soy beans, adding the soy beans with sugar and a fat ingredient, mixing and grinding the mixture, and subjecting the resulting mixture to heat treatment and cooling.

3 Claims, No Drawings

PROCESS FOR PRODUCING IMITATION MARZIPAN

FIELD OF THE INVENTION

The present invention relates to a process for producing an imitation marzipan. More particularly, it relates to a process for producing an imitation marzipan having an excellent stickiness and integrity by using soy beans as a main raw material.

BACKGROUND OF THE INVENTION

"Marzipan" is a mixture of sugar and almonds reduced to a very smooth paste. In general, marzipan can be divided into two groups. One is a heat treated marzipan and it is simply called as "marzipan". The other is a marzipan without heat treatment and it is called as "raw marzipan". In general, marzipan is produced by the following process.

That is, the former marzipan is produced by boiling down a mixture of sugar and water until a temperature of the resulting syrup reaches to 115° to 120° C. Firstly, one third of the boiled syrup (about 30 Baume degree) is added to dried almonds and the whole mixture is stirred and then an additional one third of the syrup is added, when the mixture begins to whiten and solidify. In the case where the syrup is added at once, the crystallization rate becomes slow, which results in formation of coarse crystals and therefore it is not desirable. Accordingly, the syrup is added by portions at several times in order to make the crystallization rate as fast as possible and to make the resulting crystals small and fine. When the whole mixture becomes white by continuing stirring, all the remaining syrup is added. Then, stirring is continued until the syrup is crystallized and the mixture becomes white and crumbly. When the whole mixture becomes hard and solidifies, it is broken, transferred on a marble table and then allowed to stand until it cools to room temperature. Then, it is finely divided with a grinder However, in order to prevent oozing out of a fat ingredient in the nuts, the mixture is not ground to fine powder at once but repeatedly passed through the grinder four times or so while the nip between the rolls of the grinder is reduced step by step to grind the mixture to powder after granulation (particle size of 3 to 5 mm). After it is ground to powder, a small amount of a syrup as well as a flavor, if desired, are added and the mixture is stirred. When the syrup is thoroughly mixed, again, the mixture is passed through the grinder twice or so to obtain a dough having desired consistency The dough (marzipan) thus produced is utilized for confectionery work, cake decoration and the like.

On the other hand, the latter raw marzipan is produced by adding sugar to dried almonds and thoroughly mixed. Then, the mixture is ground with a grinder after granulation. As described above, this grinding is carried out by passing through the grinder three or four times until the whole mixture is almost ground to powder. After completion of grinding, a small amount of whisked egg white is added to the mixture and thoroughly mixed. Then, egg white is further added and stirred until the mixture becomes wet. Further, it is passed through the grinder to obtain a dough having a desired consistency wherein the whole mixture is thoroughly mixed. The dough thus obtained (raw marzipan) is utilized for cake decoration and an ingredient of baked confectionery.

Marzipan or raw marzipan produced according to the above manner are easily used in confectionery work and have good workability because they have excellent stickiness or integrity.

Since almonds which are a main raw material of marzipan are a natural product, their yield is varied due to changes of weather and, further, they are expensive Therefore, hitherto, nuts such as hazel nuts, walnuts, chest nuts and the like have been used as the substitutes instead of almonds. These nuts have physical properties quite similar to those of almonds and, therefore, marzipan can be produced according to the same manner as that using almonds However, even using these nuts, the situation is not so different in that they are also natural products and expensive.

OBJECTS OF THE INVENTION

Under these circumstances, the present inventors have tried to produce an imitation marzipan by using soy beans, which are cheap in comparison with nuts such as almonds, are easily available and have been popular from ancient times in Japan, instead of almonds. However, the resulting product has a fragile structure like a bean jam and has no integrity. When water is added to the product to provide stickiness, it becomes too soft and sticky to touch, which results in deterioration of workability.

Then, the present inventors have studied to produce an imitation marzipan having excellent properties by using soy beans. As the result, it has been found that an imitation marzipan having the desired properties can be produced by subjecting soy beans to a specific treatment and then mixing them with sugar and fat ingredients.

That is, the main object of the present invention is to provide a process for producing an imitation marzipan having an excellent stickiness and integrity by using soy beans as a main raw material.

This object as well as other objects and advantages of the present invention will become apparent to those skilled in the art from the following description.

SUMMARY OF THE INVENTION

According to the present invention, there is provided a process for producing an imitation marzipan which comprises soaking dehulled, degerminated and cracked soy beans in hot water, cooling and dehydrating the soy beans, adding the soy beans with sugar and a fat ingredient, mixing and grinding the mixture, and subjecting the resulting mixture to heat treatment and cooling.

Further, in the process of the present invention, when treatment with pectinase is effected after grinding, marzipan having very smooth mouthfeel can be obtained.

DETAILED EXPLANATION OF THE INVENTION

In view of palatability and flavor, it is preferred to use dehulled and degerminated soy beans. These dehulling and degerminating treatment can be carried out according to a known method. For example, hulls and germs of soy beans can be removed by heat-drying at 80° to 85° C. for 3 minutes, coarsely grinding with a grinder in such a degree that almost all beans are cracked into two pieces, and sorting with air.

Dehulled, degerminated and cracked soy beans thus obtained are soaked in hot water. The temperature of hot water should be not lower than about 95° C., particularly, boiling water is preferred. In the case of using boiling water, about 10 minutes of soaking time is sufficient. By such a hot water treatment, bean flavor of soy beans is removed, the texture thereof is improved and further trypsin inhibitor is inactivated.

Cracked soy beans treated with hot water are then cooled. For example, they can be soaked in cold water at 10° to 20° C. for 1 to 2 minutes.

After cooling, cracked soy beans are then dehydrated. The dehydration can be carried out by using a centrifuge. Alternatively, the cracked soy beans can be dehydrated by heat-drying in such a degree that moisture of the surfaces thereof is removed by roasting at 150° C. for 15 to 30 minutes in a continuous or batch-wise oven. The dehydrated cracked soy beans thus obtained are in the state that the soy beans originally used suitably absorb water. The water absorption can be expressed by the weight gain of cracked soy beans and, preferably, it is about 40 to 90 parts by weight per 100 parts by weight of cracked soy beans before treatment with hot water.

The cracked soy beans obtained as described above are mixed with sugar and fat ingredients and ground. The mixing ratio of the dehydrated cracked soy beans and sugar such as sugar (i.e., the weight ratio of the dehydrated cracked soy beans: sugar) is preferably in the range of 1:2 to 3:1. When an amount of sugar exceeds the above range, sweetness of the resulting product is too strong and the texture thereof has no stickiness. To the contrary, when the amount of sugar is too small, bean flavor is recognized and storage properties are deteriorated. Further, the product exhibits a fragile state like a bean jam.

The fat ingredient is added in order to provide stickiness and integrity to the resulting product and to improve storage properties. It is desirable that the amount of the fat ingredient to be admixed is 4 to 20% by weight based on the total amount of the resulting product. When the amount is smaller than this lower limit, the product exhibits a fragile state like a bean jam. When the amount exceeds this upper limit, oil is oozing out from the surface thereof and the dough shows a sagging state. This is undesirable. Preferably, the fat ingredient to be used is a fat or oil having a melting point of not higher than 25° C. Preferably, an oil which is always liquid at room temperature is used because its hardness scarcely varies even by a change of temperature and an elapse of time. Nevertheless, in the case that storage properties should be further improved or a relatively harder product is desired, a fat or oil having a melting point of higher than 25° C. can be used.

According to the present invention, when sugar and the fat ingredient are admixed, in addition to these ingredients, it is preferred to further add a liquid sugar such as isomerized liquid sugar, inverted liquid sugar, sugar alcohol or a mixture thereof, particularly, sugar alcohol, more particularly, sorbitol having a solids concentration of not less than 60% is used in the amount of 5 to 25% based on the total amount of the imitation marzipan. The use of such a liquid sugar is useful for further improving stickiness and integrity of the product.

Further, in the present invention, in order to prevent oil separation which is liable to occur during the production steps, it is preferred to use an emulsifying agent such as lecithin, glycerol fatty acid esters, sorbitan fatty acid esters, propylene glycol fatty acid esters, sucrose fatty acid esters, polyglycerol fatty acid esters, polyglycerol condensed ricinoleate and the like. Particularly, the use of lecithin is effective.

The resulting mixture is mixed and ground.

It is preferred that the the solid materials are firstly admixed and ground before or after mixing. It is also preferred that grinding is carried out after granulation. The granulation can be carried out by using a known suitable apparatus or device such as a slicer, a chopper, a mixer, Stephan cutter and the like and the mixture is granulated to a particle size (about 3 to 5 mm) which is suitable for rolling in the next grinding step.

Then, granulated mixture are ground by subjecting to rolling (e.g. 25%/35 mesh on or less) and then the ground mixture is subjecting to heat treatment, for example, with a cooker, cooled, packed in a package and stored.

The heat treatment is carried out at 70° to 90° C. for 30 to 50 minutes to sterilize the mixture and then the mixture is cooled.

In the above steps, the fat ingredient or a liquid sugar is not necessarily admixed before the rolling step and they can be admixed at the same time of the heat treatment with a cooker. Further, a treatment equivalent to each treatment as described, i.e., mixing, granulating, grinding by rolling, heat treatment and cooling can be effected at once by using a single apparatus or device, for example, by using only Stephan cutter. All of these modifications are within the scope of the present invention.

Further, in the present invention, the imitation marzipan having very smooth mouthfeel can be obtained by adding pectinase to the ground soy beans mixture in an amount of 0.005 to 0.5% by weight, preferably, 0.001 to 0.1% by weight based on the total weight of the product to effect the enzymatic treatment. The basic structure of pectin is a polysaccharide wherein galacturonic acid or its methyl ester is bonded each other through $\alpha$-1, 4 bond and pectinase is the enzyme which decomposes pectin. It is necessary to add such an enzyme after the grinding step of the mixture. If the enzyme is added before grinding, the desired effect of addition of the enzyme can hardly expected. The enzymatic treatment can be carried out under such conditions that the enzyme is added to the mixture at a temperature of about 20° to 40° C. and then uniform distribution of the enzyme is maintained for 5 to 30 minutes. According to the present invention, cellulase which decomposes cellulose can be used in combination with pectinase.

The imitation marzipan of the present invention has almost no bean flavor peculiar to soy beans but has mild flavor. Therefore, the product having various flavors and colors can be obtained by adding flavors or colorants appropriately. According to the present invention, particularly, the product having a flavor of bitter almonds can be obtained by using as a flavor apricot kernel powder. In a conventional marzipan, water is added to prevent oozing out of oil on its surface. To the contrary, in the imitation marzipan of the present invention, the fat ingredient is added to provide stickiness and integrity. This is one of characteristics of the present invention. The imitation marzipan of the present invention can be used for incorporating into a dough of cake, roast confectionery, bread and the like, for filling which can be subjected to roasting, and for molding and shaping various decoration. Hardness which is suitable for molding varies depending upon the mixing ratio of the above dehydrated cracked soy beans to sugar. For example, when the ratio of the dehydrated cracked soy beans : sugar is 1:2, the rheometer value (g/0.785 cm$^2$) is about 250 to 500 at 5° C. and 180 to 400 at 20° C. And, when the ratio is 3:1, the rheometer value is about 400 to 1100 at 5° C. and 300 to 800 at 20° C. In both cases, molding can be carried out. Further, an imitation marzipan having soft properties such as that having the rheometer value of not more than 150 at 5° C. can be obtained by decreasing the amount of sugar and using a low sweetness liquid sugar in a larger amount. Particularly, such a soft imitation marzipan is useful because it is possible to use it as an all-in-mix upon incorporation thereof into a dough.

The imitation marzipan of the present invention can be used in combination with marzipan produced from other nuts such as almonds, hazel nuts, walnuts, chest nuts and the like, or beans other than soy beans as a main raw material.

The following Experiments further illustrate the present invention in detail but are not to be construed to limit the scope thereof.

Experiments

The formulations are shown in Table 1. In Table 1, all "parts" and "%'s" are by weight unless otherwise stated.

Production process

Dehulled and degerminated soy beans were soaked in boiling water for 10 minutes, soaked in cold water of about 10° C. for 1 minute and then dehydrated by a centrifuge until desired water absorption is obtained. The dehydrated soy beans were mixed with granulated sugar, granulated to a particle size of 2 to 5 mm by a silent cutter and then subjecting to rolling. In some experiments, enzymatic treatment was carried out by addition of pectinase and then a predetermined amount of salad oil and a small amount of lecithin were admixed therewith. In some other experiments, sorbitol was further added and mixed. The mixture was subjected to heat treatment at 80° C. for sterilization. Yet in some other experiments, apricot kernel powder was added as a flavor and mixing and and cooling were effected to obtain the imitation marzipans.

TABLE 1

| Ingredients (parts) | 1 | 2 | 3 | 4 | 5 | 6 |
|---|---|---|---|---|---|---|
| Soy beans | 200 | 200 | 200 | 200 | 200 | 200 |
| Water absorption | 90 | 90 | 90 | 90 | 150 | 150 |
| Sugar | 100 | 100 | 100 | 100 | 100 | 100 |
| Salad Oil | 12 | 25 | 75 | 100 | 12 | 25 |
| Liquid sugar | — | — | — | — | — | — |
| Fat or oil (%) | 3.0 | 6.0 | 16.1 | 20.4 | 2.6 | 5.3 |
| Brix | 64 | 64 | 66 | 68 | 57 | 58 |
| State of dough | having good integrity but slightly fragile | having good integrity | having good integrity | having good integrity but slight oozing out of oil | having good integrity but slightly fragile | having good integrity |

| Ingredients (parts) | 7 | 8 | 9 | 10 | 11 | 12 |
|---|---|---|---|---|---|---|
| Soy beans | 200 | 200 | 200 | 200 | 200 | 200 |
| Water adsorption | 150 | 150 | 150 | 150 | 150 | 150 |
| Sugar | 100 | 100 | 150 | 200 | 400 | 100 |
| Salad oil | 75 | 100 | 60 | 70 | 90 | 25 |
| Liquid sugar | — | — | — | — | — | 75 |
| Fat or oil (%) | 14.3 | 18.2 | 10.7 | 11.3 | 10.7 | 5.1 |
| Brix | 60 | 62 | 66 | 69 | 71.5 | 68 |
| State of dough | having good integrity | having good integrity but slight oozing out of oil | having good integrity | having good integrity | having good integrity | having good integrity |

| Ingredients (parts) | 13 | 14 | 15 | 16 | 17 | 18 |
|---|---|---|---|---|---|---|
| Soy beans | 200 | 200 | 200 | 200 | 200 | 200 |
| Water adsorption | 90 | 90 | 150 | 150 | 150 | 150 |
| Sugar | 100 | 100 | 100 | 100 | 150 | 200 |
| Salad oil | 75 | 100 | 25 | 75 | 60 | 70 |
| Pectinase | — | — | — | — | 0.05 | 0.02 |
| Liquid sugar | 50 | 50 | 50 | 30 | — | — |
| Fat or oil (%) | 14.6 | 18.5 | 4.8 | 13.5 | 10.7 | 11.3 |
| Brix | 69 | 70 | 62 | 66 | — | — |
| State of dough | having good integrity | having good but slight oozing out of oil | having good integrity | having good integrity | having good integrity and smooth | having good integrity and smooth |

| Ingredients (parts) | 19 | 20 | 21 | 22 | 23 | 24 |
|---|---|---|---|---|---|---|
| Soy beans | 200 | 200 | 200 | 200 | 200 | 200 |

TABLE 1-continued

| | | | | | | |
|---|---|---|---|---|---|---|
| Water adsorption | 150 | 90 | 150 | 150 | 90 | 150 |
| Sugar | 400 | 100 | 100 | 200 | 100 | 100 |
| Salad oil | 90 | 25 | 100 | 70 | — | — |
| Pectinase | 0.08 | 0.05 | — | — | — | — |
| Liquid sugar | — | 75 | 20 | — | — | — |
| Flavor* | — | — | — | 20 | — | — |
| Fat or oil (%) | 10.7 | 5.1 | 17.5 | 10.9 | — | — |
| Brix | — | — | 68 | 69 | 64 | 56 |
| State of dough | having good integrity and smooth | having good integrity and smooth | having integrity but slight oozing out of oil | having good integrity | fragile and bean jam-like | fragile and bean jam-like |

(Note)
*Apricot kernel powder

As seen from Table 1, when the mixing ratio of soy beans: sugar is 2:1 and water absorption of soy beans is 90 or 150 parts, the state of the resulting dough has integrity but slightly fragile in the case that the amount of the fat ingredient is about 3% by weight based on the total weight of the product (Experiments No. 1 and No. 5). In the case that the amount of the fat ingredient is about 20% by weight, the dough has integrity but oil is slightly oozing out on the surface thereof (Experiments No. 4 and No. 8). This tendency is observed in the case that the liquid sugar is admixed (Experiments No. 14 and No. 21). To the contrary, in the case that the amount of the fat ingredient is 4 to 16% by weight, the state of the dough is very good (Experiment Nos. 2, 3, 6, 7 and 22) and, in the case that the liquid sugar is admixed, it is also good (Experiment Nos. 12, 13, 15, and 16). Likewise, the same good results are obtained in the case that the mixing ratio of soy beans: sugar is 2:1.5 to 1:2 (Experiment Nos. 9, 10 and 11). Particularly, the dough obtained by admixing the liquid sugar has improved viscoelasticity and workability, and the dough obtained by addition of apricot kernel powder as a flavor has almost the same flavor as that of the real marzipan. Further, the dough obtained by treating the mixture with pectinase is smooth and has good palatability (Experiment Nos. 17, 18, 19 and 20).

To the contrary, in the case that the fat ingredient is not admixed, the state of the resulting dough is fragile and bean jam-like, and workability thereof is much worse (Experiment Nos. 23 and No. 24).

What is claimed is:

1. A process for producing an imitation marzipan which comprises:
   (a) soaking dehulled, degerminated and cracked soy beans in hot water at a temperature of at least 95° C. until the bean flavor of soy beans has been removed,
   (b) cooling the soy beans with cold water at 10° to 20° C. for 1 to 2 minutes,
   (c) dehydrating the soy beans to such a degree that water absorption of the soy beans becomes 40 to 90 parts by weight per 100 parts by weight of cracked soy beans before the treatment with hot water,
   (d) adding to the soy beans sugar in a weight ratio of soy beans : sugar of 1:2 to 3:1 and a fat ingredient in an amount of 4 to 20% by weight based on the total weight of the imitation marzipan to obtain a mixture,
   (e) mixing and grinding the mixture,
   (f) subjecting the ground mixture to heat treatment at 70° to 90° C. for 30 to 50 minutes and then
   (g) cooling.

2. A process according to claim 1, wherein the fat ingredient is a fat or oil having a melting point of not higher than 25° C.

3. A process according to claim 1, wherein the mixture is treated with pectinase after grinding.

* * * * *